Figure 1:
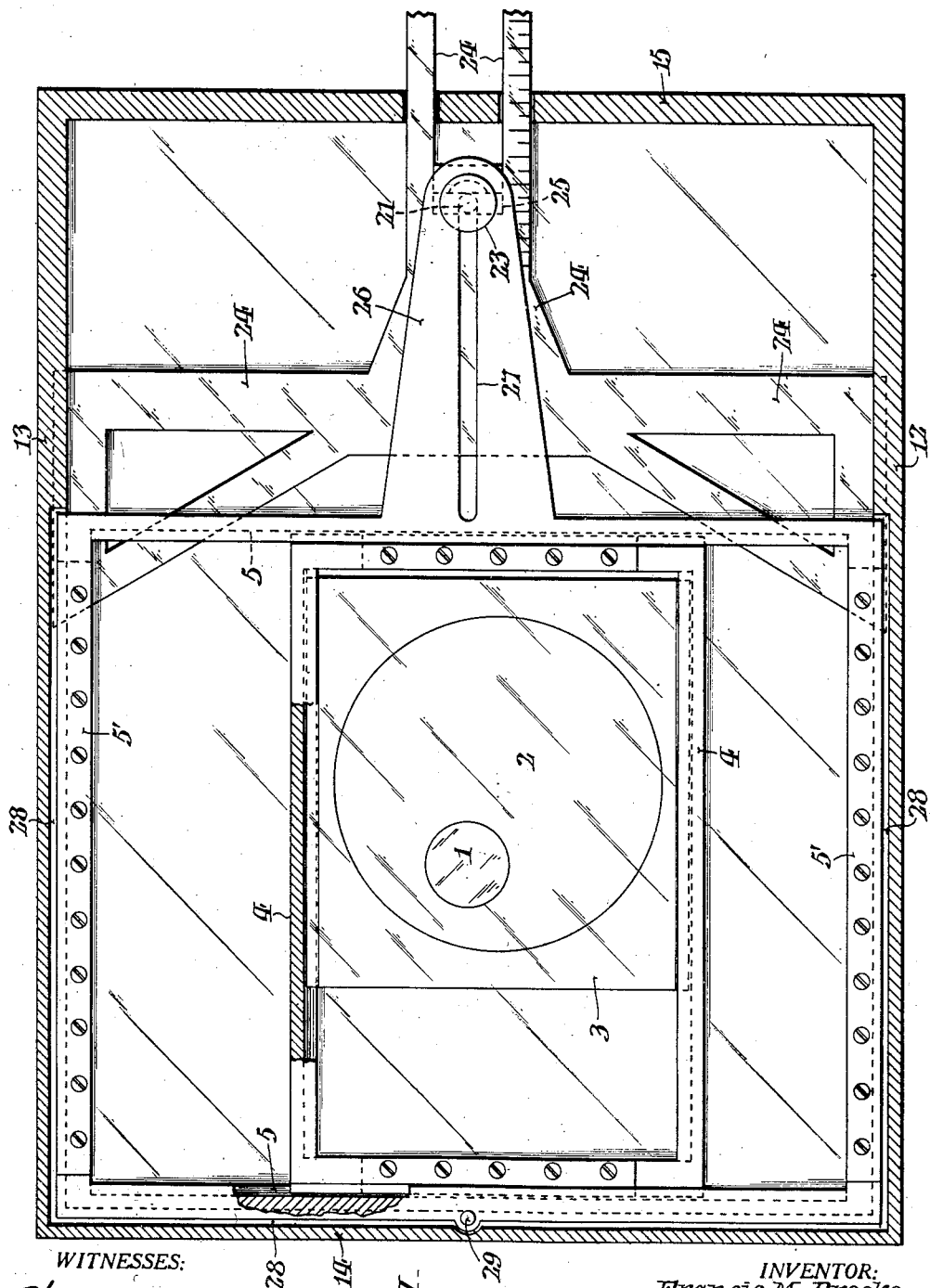

Oct. 14, 1941.     F. M. BROOKE     2,258,945
CAMERA TO GIVE PERSPECTIVE TO MOVING PICTURES
Filed June 28, 1940     5 Sheets-Sheet 1

WITNESSES:

INVENTOR:
Francis M. Brooke,
BY
ATTORNEYS.

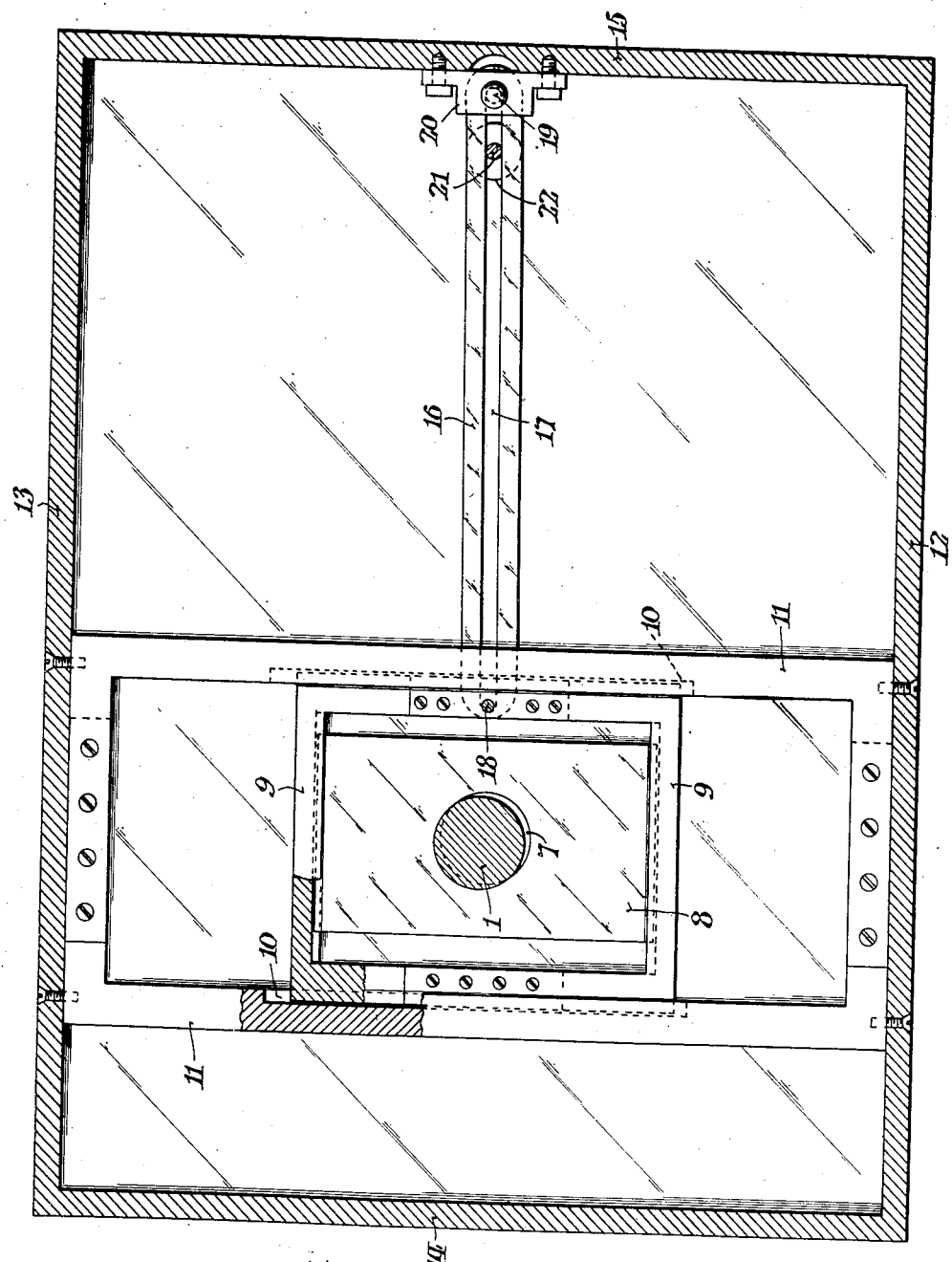

Oct. 14, 1941.   F. M. BROOKE   2,258,945
CAMERA TO GIVE PERSPECTIVE TO MOVING PICTURES
Filed June 28, 1940   5 Sheets-Sheet 3
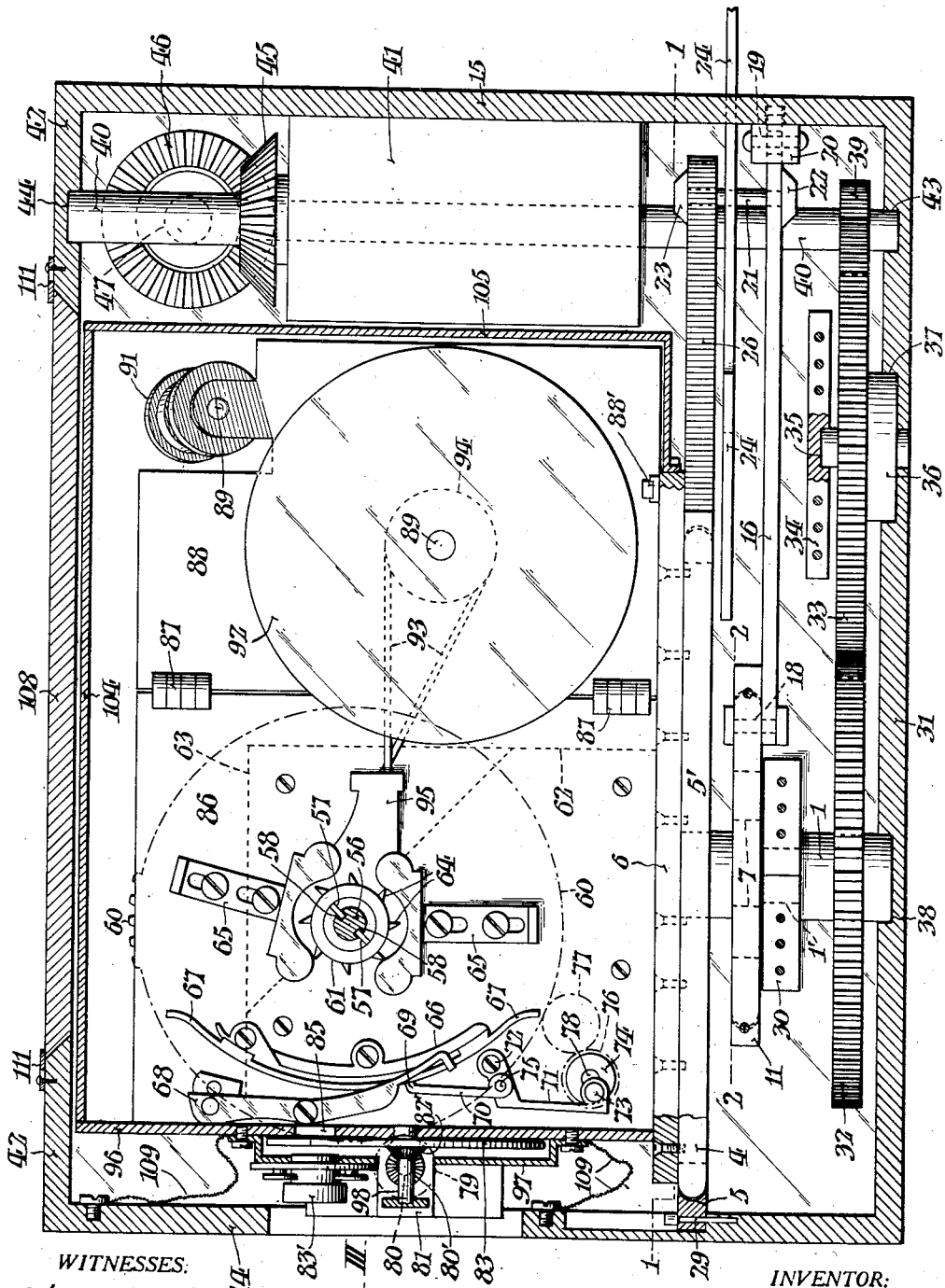
FIG. III.
WITNESSES:
Woodrow Stevens
Hubert Fuchs
INVENTOR:
Francis M. Brooke,
BY
Paul & Paul
ATTORNEYS.

Oct. 14, 1941.  F. M. BROOKE  2,258,945
CAMERA TO GIVE PERSPECTIVE TO MOVING PICTURES
Filed June 28, 1940  5 Sheets-Sheet 4
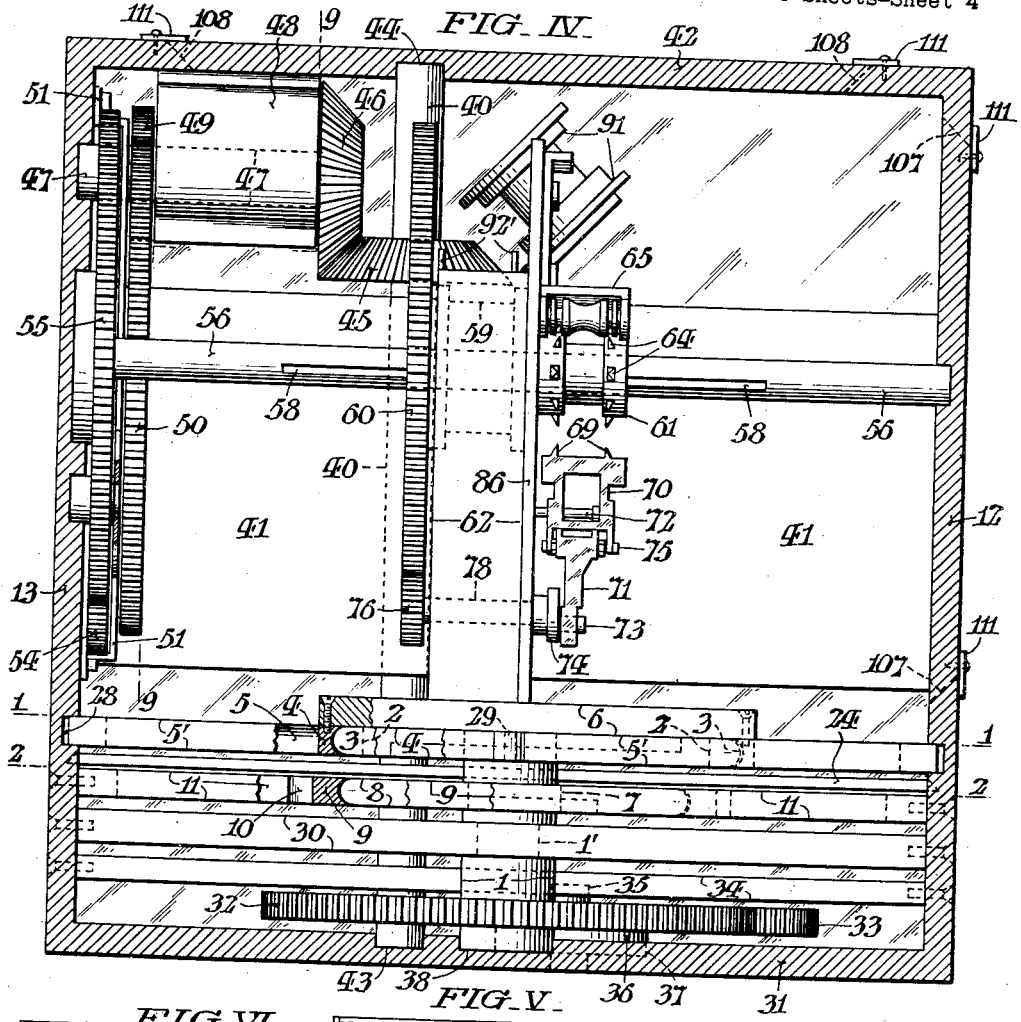
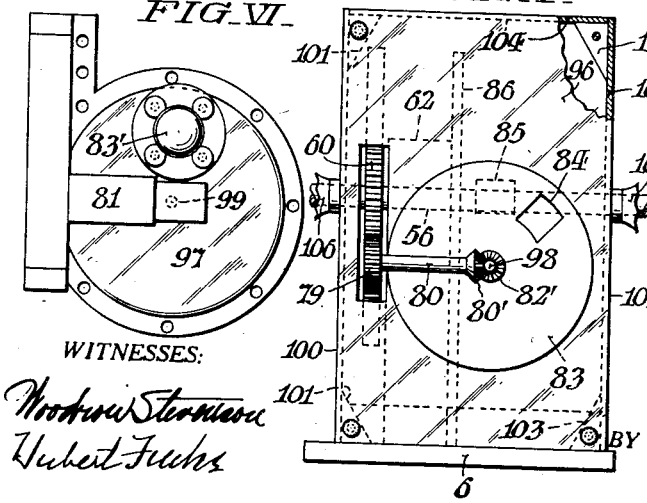
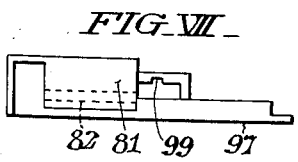
INVENTOR:
Francis M. Brooke,
BY
ATTORNEYS.

Oct. 14, 1941.                F. M. BROOKE                 2,258,945
           CAMERA TO GIVE PERSPECTIVE TO MOVING PICTURES
                    Filed June 28, 1940           5 Sheets-Sheet 5
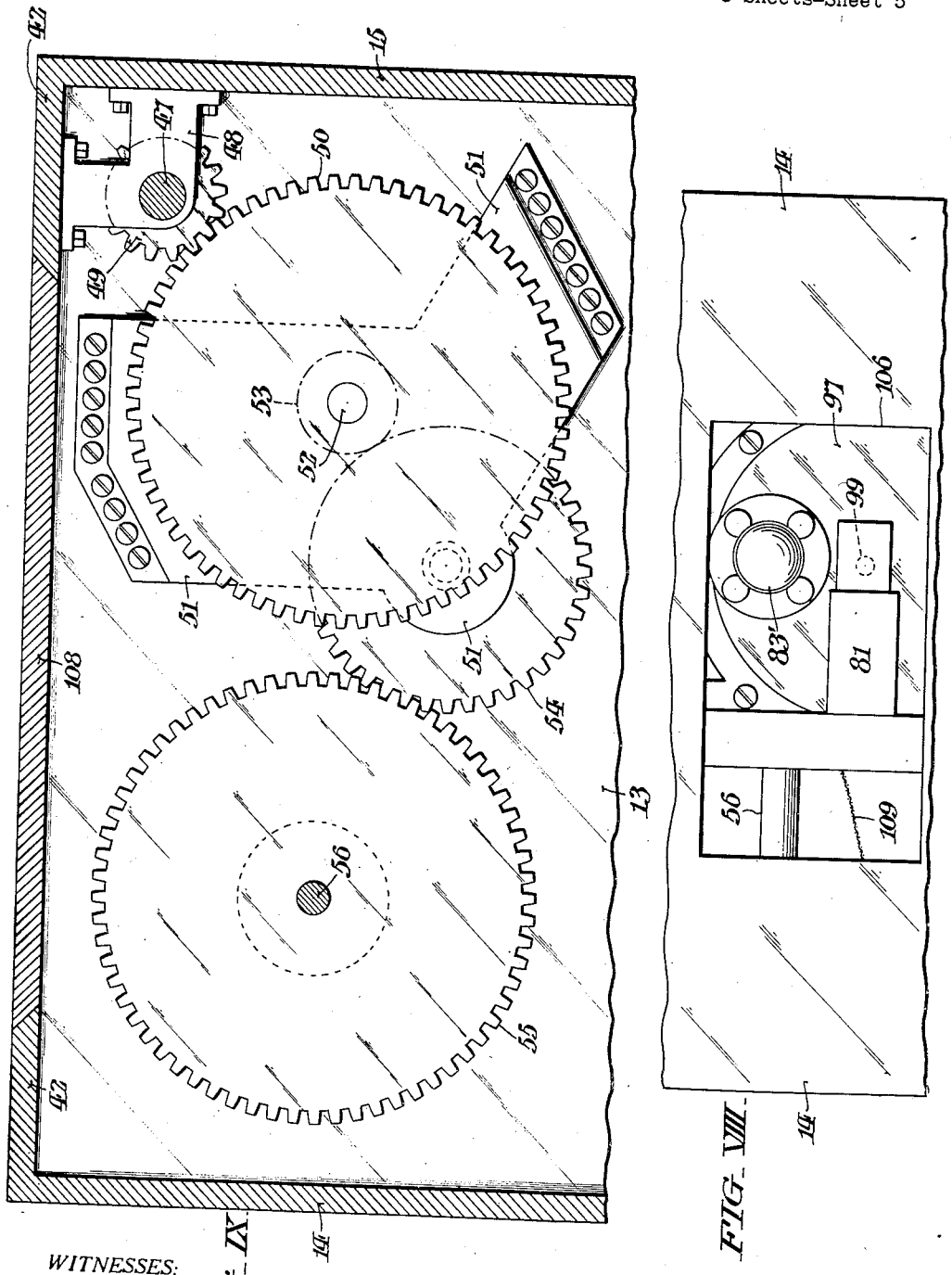
WITNESSES:
INVENTOR:
Francis M. Brooke,
BY
ATTORNEYS.

Patented Oct. 14, 1941

2,258,945

UNITED STATES PATENT OFFICE 2,258,945

CAMERA TO GIVE PERSPECTIVE TO MOVING PICTURES

Francis M. Brooke, Bryn Mawr, Pa.

Application June 28, 1940, Serial No. 343,016

7 Claims. (Cl. 88—16.6)

The object of this invention is to give perspective to moving pictures. The method of producing this effect is to take alternate photographs as the object would be seen first by the right and then the left eye, in continuous sequence of alternations. The basis for this theory is that the image that is flashed on the screen for a very short time interval is seen on the retina of the eye, or the sensation of sight remains in the mind a considerably longer interval. This is the basis for the ordinary moving picture. Notwithstanding the fact, that half the time or more, there is no light upon the screen, there is the illusion to the eye that the picture is constantly on the screen and that certain objects in the picture are moving. Actually there are a series of pictures, where the background and much of the detail has not moved but certain objects in the sequence of pictures are in a gradually different relative position.

Now, with a stereopticon camera, or double camera simultaneously taking two photographs with the lenses a few inches apart and then having the pictures in the same relative position as were the two films, by a partition between the two eyes and focusing magnifying glasses, it is possible in still pictures to give real, deep and striking perspective. While this doubtless could be done with a moving stereopticon camera, the audience could not be bothered with the necessary elongated equipment for their eyes. Therefore it is necessary to rely on the lingering of the last picture in the mind, merging with the succeeding one, giving a continuous composite effect of a view of the photographed objects seen with two eyes simultaneously and accordingly grasping three dimensions.

There is an average distance of about two and a half inches between the pupils of human eyes. Each eye focuses on the specific object on which the mind concentrates. This gives the effect of distance by triangulation. It is the method of range finding for artillery fire. Therefore by alternating photographs taken from two to three inches apart, and having a corrected pointing of the camera at the emphasized or central object for each alternation, the composite effect should give real perspective. To have two cameras operating on a wide film would be an expensive process and call for special projectors. Two narrow films would require alternate splicing of the film.

Therefore practically the question resolves itself into the method of one camera being moved from one side to the other a distance of two or three inches between the taking of each photograph and simultaneously pointing the camera from each position at the central or emphasized object at the correct angle, whether it is 10 feet or a mile from the camera.

In carrying out this method the following means and their operation are described:

First, however, another point should be considered. If we sit say ten feet from a tree, and close first one eye and then, on opening it, close the other, we note that certain objects are discernible by the right eye and that the tree hides from the left; and conversely. With both eyes open we see somewhat around the tree, each eye contributing something to the vision that the other eye does not see, while most of the vision is jointly participated in by both eyes. Therefore, the composite moving photograph covers more than a picture taken with a still camera, as certain objects blot out all or parts of other objects seen from any specified position of the camera. This one eye vision from each camera position will tend to give perspective as it does to the eye in a three dimension field. The object therefore, is to show on the two dimension screen, what and as the human eye would have seen in a three dimension world.

To explain the means of accomplishing the above, the following drawings are utilized.

Fig. I is a horizontal cross section of the camera taken along the line 1—1 in both Figures III and IV.

Fig. II is a horizontal cross section taken along line 2—2 in Figures III and IV.

Fig. III is a vertical elevation from the left side of the camera with the left side covering removed.

Fig. IV is a front elevation of the camera with the front cover and certain parts adjacent thereto, for clearer view, removed, as later enumerated.

Fig. V is a front view (vertical elevation) of the inner camera or dark chamber for the film showing the shutter.

Fig. VI is a front view of the cap that covers the shutter and its driving mechanism and contains the lens; taken independently.

Fig. VII is an elevation of Fig. VI, looking from the bottom of the camera upwards when the cap is fixed in position.

Fig. VIII is a partial vertical elevation of the front of the camera, showing the lens and opening for its vision while it travels from side to side.

Fig. IX is an internal view of the right side of the camera showing only its various spur gears attached along the line 9—9 Fig. IV.

In explanation

Referring to Fig. I: 1 is a rotating shaft that revolves circular eccentric cam 2 in sliding plate 3 in cage 4. As cam 2 rotates 3 slides forward and backward relative to the camera and simply neutralizes any motion of 4, forward and backward, as desired. Cam 2, however, forces cage 4 sideways along the grooves 5 of a frame 5' with periodic motion through a range of 1 and $\frac{7}{16}$ inches.

To increase the range of camera movement from 1 and $\frac{7}{16}$ inches to 3 inches, from one side to the other, it is only necessary to increase its length 1 and $\frac{7}{16}$ inches and increase the action of cam 2 accordingly, with the corresponding changes in cage 4 and frame 5', and in the intermediate gears later mentioned.

At each extreme side position of cage 4 there is an instantaneous center of no velocity and at that instant the shutter exposes the film, as later described.

As the inner camera base 6 is fastened on 4, the alternating spacing of 1 and $\frac{7}{16}$ inches (or a greater distance if so desired) by the camera between photographs is accomplished.

Referring to Fig. II: Shaft 1 is distorted to produce concentric cam 7, which rotates in slide 8 contained in cage 9, which slides in grooves 10 of supporting frame 11, which is fastened to the left side wall 12 and right side wall 13. It may be noted that slide 8 slides back and forward towards front wall 14 and back wall 15, which cancels all movement as desired in said direction but moves cage 9 from side to side toward 12 and then towards 13, the total action being a small fraction of an inch. It may be also noticed, that cage 4 (Fig. I) and cage 9 are synchronized so that both move in the same sideways direction simultaneously and likewise have the maximum travel simultaneously, and the same periods of no velocity. They are activated by the same shaft 1. The purpose of cage 9 is to slightly move the direction of the inner camera base 6 (Figs. III and IV); by the movement base 4 (Fig. I) the camera will point at the desired central object from both the left side 12 and the right side 13, the inner camera pointing in, in both positions and this to a varying degree according as the desired central object is a few feet from the lens to a mile away. This adjustment of the change in angle from the determined cam and the transmission of this action is as follows:

Attached to cage 9 which slides in grooves 10 is the long split link 16 with groove 17. Pin 18 makes the rotable connection. The other end of link 16 has a rotable connection with pin 19 in the fixed bracket 20 on the back of the camera 15. It may be noticed that as cage 9 slides from side to side, the pin 18 moves the forward end of 16 an equal distance in the same direction. As the said forward end describes a small arc, the longitudinal play around pin 18 permits 18 to describe the chord.

It may also be noted that the motion of the end of 16 at pin 19 is purely slightly rotary but with no sideways motion. Therefore, a scale of sideways motion is established for 16. At 18 it is equal to the spread of the cam 7, a total of about a quarter inch, while at 19 it is zero. To utilize this scale there is the sliding pin 21 in groove 17, retained by the mushroom bottom and top numbered 22 and 23 respectively (23 see Fig. I).

It is only necessary to move pin 21 forward towards the front of the camera 14 to increase the arc it describes, or back towards wall 15 to decrease the arc. There is a hand control 24 (see Figures I, III and IV) which fits around pin 21 with a cross groove 25. 24 slides in tracks in sides 12 and 13 and extends out of the back of the camera 15 through accommodating holes. Therefore, by pulling member 24, which is made of sheet steel, backwards or pushing it forward the relative position of pin 21 is so changed. A calibrated scale on the external extension of 24 will designate the correct position for the central object at the varying distance from the camera lens.

In Fig. I the frame 5' has an extension 26 with a groove 27 through which pin 21 extends and is supported by previously mentioned mushroom top 23. Frame 5' is slightly movable in the grooves 28 in the sides 12 and 13 and front 14. It pivots on pin 29 in the center of 14. Therefore by moving pin 21 as described the position of frame 5' is turned a gradual angle by the movement of the cam 7, and this movement intensified or minimized as by operating hand control 24, pin 21 is slid along the somewhat parallel grooves 17 (Fig. II) and 27 (Fig. I).

It should be noted that the action of the pin 21 becomes less as the radius from the pin 29 is increased or the control 24 moves it towards 15 and less as moved forward towards the front 14, in 26 Fig. I as well as 16 Fig. II.

Therefore the effect is the same, or an increasing or multiplying effect as it receives from its relative position in 16, as previously described, and the opposite from a cancelling or a modifying effect. This is important as the change in the axis for the internal camera should be in a scale something like .05 of an inch to .0025 of an inch, dependent on the control object being a few feet to a mile from the lens. As frame 5' is turned so is cage 4 a like amount, and fastened upon cage 4 is the base 6 of the internal camera (Figs. III and IV).

The internal camera contains the lens, film, etc., so that it is evident that the action developed of cage 4, and camera base 6, is the necessary action desired for the internal camera, described as the desired object: That is to take alternate pictures at a distance of the camera of about two and a half inches apart (in a horizontal plane) and simultaneously with a varying turning in of the camera to point directly at the central emphasized point and immediately and constantly adjustable angles as the distance varies from said central object to the lens. It also is evident that the internal camera at the times (of exposure) at the maximum distance or relative position both sidewise and turning in, is at instantaneous centers of no velocity, or actually still.

Therefore the object is obtained.

It is simpler for the reader if this anti-climax is utilized, showing the results obtained as soon as the above necessary actions have been developed rather than carrying through the rest of the apparatus which is supplementary but necessary and additionally complicated because it is necessary to synchronize the various actions, provide against the interference of moving parts and provide darkness where essential.

To continue the further detail and its operation.

The shaft 1 which operates the cams 2 and 7 is held in position by the support 30 (Figs. III and IV). The diameter of shaft 1 is materially reduced at 1' inside of 30 so as to produce thrust bearings at the top and bottom of the support 30. The support 30 is preferably made in two opposing parts for convenience in application to the reduced part 1' of the shaft 1, as readily understandable from Fig. III. The ends of 30 are fastened to sides 12 and 13. Shaft 1 is also fitted into a circular recess 38 in the camera bottom 31. Fastened on shaft 1 is the spur gear 32, which has a 4 inch pitch diameter and is driven by an intermediate gear 33 (4 inch pitch diameter) which is held in position by the brace 34, and in which a shaft 35 has journal bearing at its upper end; while the hub 36 of gear 33 seats in a circular recess 37 in the bottom 31 of the camera.

Intermediate gear 33 is driven by the spur gear 39 shown only in Fig. III. Gear 39 is fastened on the driving shaft 40. It should be noted that the pitch diameter of gear 39 is 1 inch so that dividing it into gear 32 the ratio is one to four, of the driving shaft 40 and the shaft 1, and consequently the cams 7 and 2. It should also be remembered that during each revolution of shaft 1 the cams 2, 7 reach their maximum side thrust position twice, and consequently the inner camera base 6, at which position there is no motion of the inner camera and the designed position and moments for the snapping of the photographs.

Therefore there are two photograph positions for every revolution of shaft 1. Shaft 40 turns twice to obtain each position.

Shaft 40 is an extended armature shaft of the electric motor encased in box 41 (Figs. III and IV) in which may also be a governor, rheostat or any desired speed control device, or shaft 40 may be geared and driven in 41 as seen fit.

Shaft 40 extends from the bottom of the camera 31 to its top 42 and is fitted in journal recesses 43 and 44 respectively (Figs. III and IV). Near the top of shaft 40 is fitted miter gear 45 which in turn at an angle of 90° drives miter gear 46, which turns in a plane parallel to side 13. These miter gears 45, 46 each have 1 and ¼" pitch diameter so 46, and its shaft 47 (see Figs. III, IV and IX) have no change in velocity or driving rate from 40. Shaft 47 is held in position by brace 48 (Figs. IV and IX) which brace is bolted on back 15.

Gear 46 and spur gear 49 are locked on shaft 47 in brace 48 so that the face of each gear acts as a thrust bearing against said brace. Spur gear 49 has a pitch diameter of one inch, it meshes with gear 50 which has a pitch diameter of 4 inches, and these two gears are in the same plane, see Fig. IX and Fig. IV. Remember, gear 50 will revolve one quarter as fast as gear 49 on shaft 47 or shaft 40. Gear 50 is retained in position by plate 51 through which the shaft 52 is inserted. The other end of shaft 52 is journaled in sidewall 13. Thus the face of the gears 49, 50 act as thrust bearings.

Plate 51 is drawn to scale in Fig. IX. It would hardly be visible between the spur gears in Fig. IV, therefore the width of 51 is to ⅓ scale there so as to show white on each side of it and make it visible, the length is correct as to scale.

On shaft 52 is spur gear 53 which is dotted on Fig. IX and nowhere else visible. Gear 53 revolves like 50, one fourth as fast as the driving or power shaft 40. 53 has a pitch diameter of one inch. In its plane, which is closer to side 13, than that of the gears 49 and 50, is the intermediate gear 54 and gear 55. The intermediate gear 54 is supported by plate 51, and incidentally has a pitch diameter of 2 and ½". This size is used for spacing, as an intermediary gear it in no way affects the ultimate ratio. Gear 55 has a pitch diameter of 4" so it revolves but one-quarter as fast as gear 53, and, accordingly but one-sixteenth as fast as propeller shaft 40.

To simplify the synchronizing we now have a ratio of rate of revolutions of gear 55 to shaft 1, or the cams 2 and 7, of one to four.

Now gear 55 is fastened upon shaft 56 (Figs. IX, IV and III), and the hub of said gear is inserted in wall 13, while shaft 56 extends all the way across the camera to wall 12, where it is inserted, the recess being utilized for both a lateral and thrust bearing. Shaft 56 also passes through the inner camera but it is loosely encased, and as the casing is sealed there are no light leaks.

Now the inner camera rests on the slightly twisting and rapidly sliding camera base 6, therefore the encasement of shaft 56 must have sufficient clearance to prevent binding, while it must also drive various parts of the moving inner camera. The connection is as follows: See Fig. III. 57 are keys or projections that slide in the grooves 58, see also Fig. IV, which rotate both the hub 59 of spur gear 60 and the drum 61 for the film, which is attached to hub 59. 62 is a part or extension of the base 6, it is split at the intersection of shaft 56 for the insertion of hub 59 and the upper back part 63 is screwed in place. Now while we are having both the periodic side ways motion of base 6 and the inner camera and also a slight alternating twisting motion; the shaft 56 whose only motion is rotary, turns gear 60 and film drum 61 clockwise looking from the right side 13 of the camera, and they are also synchronized in turning at a constant relative velocity to the shaft 1, and the position once correctly set never change.

The film, the description of the apparatus for which, in complete detail will later be described, passes over the top of drum 61 and is engaged by the teeth 64 which fit in the perforations on the sides of the film. There are two sets of opposing teeth of eight each, making eight spaces on the drum 61. Therefore for each revolution of drum 61, an amount of film is delivered from the top, and pulled back by the bottom of said drum, equivalent to eight individual spaces for eight photographs. It should be mentioned that 65 are the two adjustable clamps that slide open to insert the film and then are pressed into position to hold the film in place on drum 61, assuring the meshing of the teeth 64 with the holes in the sides of the film. The film on leaving the top of the drum 61 makes a loop of about 2 inches of film hairpin shaped and is placed over the film support 66, Fig. III, and is held in position by film retainer 67, which is clamped open for inserting the film and then later released in position by the part 68. It should be noted that in Fig. IV, parts 66, 67 and 68, as well as other detail between them and front 14 of the camera are omitted for clarity of view of the moving parts.

The film comes out of the bottom of the support 66 and retainer 67, is looped as explained relative to its entrance and then passes around the bottom of drum 61, being retained in position by lower clamp 65. As is probably appreciated, the excess loose film or play is due to the fact that the drum 61 turns at a constant rate while the film must be still before the lens, so a constant starting and stopping of the film is required between the support 66 and retainers 67, and the average rate of speed of the film between said parts 66 and 67 must be the same rate per inch as the film travels over and under drum 61. This is arranged by the fingers 69—Figs. III and IV.

These fingers 69 are moved upwards, then backwards until they penetrate the holes in the film, pull the film downwards towards the bottom 31, where the film rests, being held in position by the friction of the film support 66 and retainer 67 and moving only through said parts as effected by the fingers 69. This leaves at alternate intervals, consequent spaces of film exactly spaced on the center of the support 66, opposite the camera lens 83' for the intermittent flashes of light composing the photographs.

The operation of the fingers 69 may be noted on Figs. III and IV as follows: Member 70, on the ends of which are the fingers 69, is held against the retainer 67 by a spring which is concealed in the latter figures, the scope of which spring is limited by a hidden extension of part 71, which is hung on pin 72 on which it can slightly rotate. The other end of the part 71 is fastened by pin 73, which pin rotates with the circular disk 74. It is obvious that as 74 rotates, part 71 at the point 75 where the member 70 is attached, describes something of an ellipse. Due to the fact that the member 70 can only be pressed by the hidden spring a certain distance towards the back 13, as disk 74 rotates counter-clockwise (Fig. III) member 70 is clear of the retainer 67 on the up stroke, then as the pin 73 moves towards the camera front wall 14, the member 70, like a seesaw moves, towards the camera back wall 15 with fingers 69 passing the edges of the retainer 67 and finding the small side holes in the film. As the pin 73 rotates towards the camera bottom 31, the film is pulled through the film support 66 and retainer 67 until said pin is at the bottom. As the pin 73 rotates towards the back wall 15 the fingers 69 disengage, the film remains still while said fingers move up during most of a half revolution of the disk 74, preparatory for another pull on the film.

In Fig. III may be noticed the dotted circles 76 and 77 of ½ inch diameter. These are the pitch circles of the hidden gears turning the disk 74. Disk 74 is connected on shaft 78.

These are more distinct in Fig. IV, but here 77 is hidden behind 76. 77 is an intermediate gear meshing both 76 and 60. As the pitch circle of gear 60 is 4 inches and of gear 76, ½ inch, the desired ratio of 8 to 1 is obtained. The necessity for this ratio was just previously explained. It is now only necessary to have the camera shutter operate in correct time with the film movement just discussed. This is seen in Figures III and V. Gear 60 rotates spur gear 79, which is ½ inch pitch diameter, giving the necessary ratio of 8 to 1. 79 is keyed to shaft 80 which is held in position by support 81 in channel 82 (both seen in Fig. VII) and are placed when the cap containing the lens 83' is placed on the front of the inner camera. The cap is comprehensively shown in Fig. VI and in partial cross section in Fig. VII.

On shaft 80 is fitted miter gear 82 with its couple 82', each of ¼" pitch diameter and changing only the angle of transmission of power by a right angle.

82' is keyed to the circular shutter 83, which has an opening 84, which when it coincides with the opening 85 allows the light to flash on the film.

It may now be noted that when the entire camera is correctly timed in assembling, it is completely synchronized and the desired results take place simultaneously.

The internal camera is moved to the extreme side of the main or external camera and comes for an instant to a complete stop and at this exact instant the shutter snaps a picture. Also the internal camera has been pointed with the correct angle at the central or desired emphasized object and this twisting movement has also temporarily ceased at the same instant. The film has been moved through the internal camera so as to time perfectly with the operations and is also momentarily still.

Having covered the various operations more directly, it is well to consider now certain details of construction. First, however, the provision for the film being received by and taken from the drum 61 which was mentioned would be later explained, should be covered: In Figs. III and IV there is a sidewall 86, resting on base 6. In Fig. III may be noted hinges 87 which hold the extension of wall 86, number 88. Fastened on extension 88 are the regular axes 89 to hold the spools 91, 92 for the film. By swinging extension 88 forward at a right angle, the new film can be placed on the axis 89 on which it can turn with a resistance to prevent slack. The extension 88 is then closed in the same plane as the wall 86 and held by the catch 88'.

In Fig. IV 92' indicates the visible tops of the sidewall of the film spool 92.

The film is laid in the tracks of the spool 92 (Figs. III and IV) and from there over the drum 61. From there on the travel of the film back to the drum 61 has previously been described.

From the lower part of the drum 61 the film goes to spool 92, which was empty and was placed to receive it. This spool 92 is driven counter-clockwise by a reversed spring belt 93 working on pulley 94 and runs through guard 95 over the extreme left side (Fig. IV) of the drum 61. The spring belt 93 slips so as not to tear the film but to keep sufficient tension to wind it firmly on the spool 92.

Extension 62 is an integral part of base 6 to support the shaft 78, hub 59 and the intermediate gear 77, also the sidewall 86 is screwed to 62 to support it. On the extension 62 are affixed the various parts of the inner camera on its right side (Fig. IV).

On the front of extension 62 is screwed the front 96 of the inner camera, Figs. III and V, which front 96 supports the shutter 83 and the cap 97, Figs. VI and VIII. It is also in conjunction with the cap 97 to keep all light out of the inner camera. Miter gear 82' on which the shutter 83 is fastened and spins on the small shaft 98, which is held in position in two recesses, one in camera front 96 and the other 99, in the center of the circle of the cap 97 which is screwed on said front 96.

There are the side walls 100, Fig. V, which are screwed to the front 96 and support 101.

There is the top 104 screwed to support 101 and opposing support 103.

There is also the back wall of the inner camera 105 (see Fig. III) which is an addition or extension to the base 6 on which it is screwed and then turns up 90° to form the back and is screwed into support 101, top 104 and side walls 100. The right side 102, Fig. V, must have a removable section to change the film spools 92 and 91. Therefore, supports 103 are screwed on it and removed with it. Thumb screws through front 96 and inner camera 105 hold it in place. Interlocking joints can be used in the edges of the four sides and top of the box described to seal them against light. Incidentally, the supports 102, 103, etc., can be used for additional screening. The front part of support 102 is screwed securely to the flexible tube 106, Fig. V, covering shaft 56, to seal light, is attached to the forward part at sides 100 and 102. In Fig. VIII is a partial view of the front of the camera 14 to show a rectangular space or opening of convenient size, to allow for the side movement of the lens 83' up to 3 inches, for the manual adjustment of an iris if attached to the lens, etc. This is the only place where light leaks into the main camera. This can be cured, if desired, by fastening a loose cloth, 109, under the edge of 97 and fastening it to the inside of front 14, just as has been successfully used in panorama cameras; see curtain 109 also in Fig. VIII partially cut away. This is loose enough to permit the movement of the shutter cap 97, and is fastened on the inside behind the opening aforesaid.

In fact, if this method is employed the side-walls 100, 102, 105 and top 104 can be dispensed with.

It should be mentioned that in the sidewall 12 there is a door 107, as indicated by dotted lines in Fig. IV that starts behind shaft 56, and a door 108 in the top 42 as indicated Figs. III and IV. The first is for access to the film spools 91 and 92, and both for oiling. These doors 107, 108 are held in place by thumb locks 111.

Support 30 and brace 34 are screwed to sides 12 and 13 and add additional strength to the main camera, which is screwed together at the 90° edges, which can be interlocked in steps if desired as greater security against light.

Attention is also called to the fact that the more recently marketed magazine which is already loaded with 50 foot rolls of 16 millimeter film and spare spool, with certain adjustments and modifications of the subject camera, could be readily substituted for the majority of the interior camera.

Having herewith described my invention, I claim the following:

1. In a moving picture camera an eccentric cam in a sliding plate in a sliding frame giving a slight alternate side motion to an elongated link which turns at its opposite end where attached on the back of the camera, said link containing a sliding pin with mushroom shaped top and bottom, operating in long groove in center of said link, said pin being subject to movement from external manual control by a plate which slides in grooves in camera's sides and said plate has a small groove at about 90 degrees to groove in link, and extension arms on which are calibrated for corresponding distances from the lens to photographed central object, a superimposed link extension, with slit, containing top portion of said sliding pin, which is a part of another frame, working in grooves in the side of the camera and turning on a pin in the center of the front of the camera, which frame contains a sliding cage which oscillates by the action of another cam, such cage being the base for the base of the camera.

2. In a moving picture camera, two concentric cams in different but parallel planes, one with the action a few inches, the other a small fraction of an inch, both encased in slides in sliding cages; which cams are synchronized so as to have their maximum side movement and periods of rest at simultaneous intervals, the action of the smaller cam effecting by a twisting motion the position of the frame for the upper and larger cam through the connection of a sliding pin which rides in a fixed link extension of said upper frame in a groove on slot in said extension, said pin sliding in slot of link connected to cage of smaller and lower cam, and the travel of said pin through the slots in said extension and link being controlled by a manually operated calibrated extension of a sliding plate, located between the planes of said cams, said plate having a slot perpendicular to the prior mentioned slots, which holds the said pin in the desired position, or advances it to such position, for the purpose of turning the cage of the large cam, which in effect is the base for the camera base, effecting the angle that is desired.

3. In a moving picture camera; a base for an inner moving picture camera which base rests upon a cage that moves alternately from side to side a desired and predetermined distance of about two and a half inches, said cage slides in a frame which is free to turn a slight angle as effected by another cam, which produces a side to side action of about a quarter of an inch and said action is transmitted to the frame by a movable pin in a slot in a link and in a slot in an extension of the said frame, and is controlled by a plate that slides and can be moved by hand by the extension that extends through the camera, and on which desired distances are scaled, said plate controlling the position of the pin in the two mentioned slots.

4. In moving picture apparatus, a camera supporting-frame, a slide in said frame, an eccentric cam in the slide; a second frame in which the supporting-frame is reciprocative; a pivot at one end of the second frame, and means at the opposing end thereof for variably controlling its angular movement; and means whereby the eccentric cam is rotative to effect conjoint reciprocation of the slide in one direction with alternate movements of the camera supporting-frame in an intersectingly related direction.

5. In a moving picture apparatus, a camera supporting-frame, a slide in said frame, an eccentric cam rotatively mounted in the slide; a second frame in which the supporting-frame is laterally and alternatingly shiftable; a pivot at the forward end of the second mentioned frame and a slotted extension at the rear end thereof; cam actuated means coactive with said slotted extension for variably controlling angular oscillation of the second mentioned frame; and means whereby the eccentric cam is rotative to effect conjoint reciprocation of the slide to and fro with alternate movements of the camera supporting-frame laterally.

6. In a moving picture apparatus, a camera supporting-frame; a plate slidable in said frame; a circular cam, rotative in a complemental groove in the slidable plate, rigid with an eccentrically related drive-shaft; a second frame in which the supporting-frame is shiftable alternately sidewise within determinate limits; a medial pivot at the forward end of the second mentioned frame, and an aligned slotted extension at the rear end thereof; a second cam on the drive-shaft in parallel with the slide plate cam; means operatively coordinating said cam with the second frame including an element shiftable along the slotted extension thereof to effect its variable angular oscillation; and means whereby both cams aforesaid are simultaneously rotated to effect reciprocation of the slidable plate forwardly and rearwards with concurrent movements of the camera supporting frame alternatingly sidewise.

7. The combination of claim 6, wherein the drive-shaft embodies a distorted portion providing the second cam, a slide concentrically related to the drive-shaft operatively engages the shaft distorted portion, a frame affords slight reciprocative support for said slide with concurrent similar movement laterally, and means synchronize said movements with those of the camera supporting frame, such means comprising a slotted link pivotally attached at one end to the slide aforesaid, with a slight longitudinally movable connection at the other end to a stationary fulcrum, and a shifter, movable relative to a calibrated distance scale, operatively coordinates said link and the camera supporting frame slotted extension, for synchronous angular movement.

FRANCIS M. BROOKE.